US008451466B2

(12) United States Patent
Shoji et al.

(10) Patent No.: US 8,451,466 B2
(45) Date of Patent: May 28, 2013

(54) IMAGE FORMING APPARATUS

(75) Inventors: Yutaka Shoji, Tokyo (JP); Junji Shirakawa, Tokyo (JP); Takayuki Muneyasu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1318 days.

(21) Appl. No.: 12/222,833

(22) Filed: Aug. 18, 2008

(65) Prior Publication Data

US 2009/0073514 A1 Mar. 19, 2009

(30) Foreign Application Priority Data

Aug. 16, 2007 (JP) ................................ 2007-212331

(51) Int. Cl.

| | |
|---|---|
| ***H04N 1/00*** | (2006.01) |
| ***H04N 1/60*** | (2006.01) |
| ***G06F 3/12*** | (2006.01) |
| ***G06F 17/00*** | (2006.01) |
| ***G06K 15/00*** | (2006.01) |
| ***G03G 15/20*** | (2006.01) |

(52) U.S. Cl.

USPC ........ 358/1.14; 358/400; 358/1.15; 358/1.16; 358/1.9; 399/33; 726/1

(58) Field of Classification Search

USPC ......... 358/400, 1.15, 1.16, 1.9; 399/33; 726/1

See application file for complete search history.

(56) References Cited

U.S. PATENT DOCUMENTS

| | | | | |
|---|---|---|---|---|
| 5,124,809 | A * | 6/1992 | Koishikawa | 358/400 |
| 5,179,410 | A * | 1/1993 | Farrell et al. | 399/9 |
| 6,535,297 | B1 * | 3/2003 | Steele et al. | 358/1.15 |
| 6,957,025 | B1 * | 10/2005 | Sinn et al. | 399/84 |
| 7,225,249 | B1 * | 5/2007 | Barry et al. | 709/227 |
| 7,773,893 | B2 * | 8/2010 | Wagatsuma | 399/33 |
| 2006/0140196 | A1 * | 6/2006 | Tanaka et al. | 370/401 |
| 2006/0227378 | A1 * | 10/2006 | Mihira | 358/1.16 |
| 2008/0180709 | A1 * | 7/2008 | Tsuchitoi | 358/1.9 |
| 2011/0119732 | A1 * | 5/2011 | Dunn | 726/1 |

FOREIGN PATENT DOCUMENTS

| | | |
|---|---|---|
| JP | 02-163244 | 6/1990 |
| JP | 09-068832 | 3/1997 |
| JP | 11-130321 | 5/1999 |
| JP | 2002-174967 | 6/2002 |
| JP | 2003-280303 | 10/2003 |
| JP | 2004-309714 | 11/2004 |

OTHER PUBLICATIONS

Notice of rejection of corresponding Japanese patent application No. 2007-212331 issued on Feb. 21, 2012.

Notice of rejection of corresponding Japanese patent application No. 2007-212331 issued on Sep. 18, 2012.

* cited by examiner

*Primary Examiner* — Akwasi M Sarpong

(74) *Attorney, Agent, or Firm* — Harness, Dickey & Pierce, P.L.C.

(57) ABSTRACT

A disclosed image forming apparatus includes an image transferring unit configured to transfer an image to a recording medium; a fusing unit provided downstream of the image transferring unit and configured to fuse the image transferred by the image transferring unit with the recording medium; a recording medium conveying unit provided between the image transferring unit and the fusing unit and configured to convey the recording medium from the image transferring unit to the fusing unit; a conveyance failure detecting unit configured to detect a conveyance failure of the recording medium; and a recording medium evacuation unit to which the recording medium can be evacuated in the event that the conveyance failure detecting unit detects the conveyance failure. Plural recording medium evacuation units are provided and plural recording media can be evacuated to each of the recording medium evacuation units.

9 Claims, 7 Drawing Sheets

IMAGE FORMING APPARATUS

BACKGROUND OF THE INVENTION

1. Field of the Invention

The present invention relates to an image forming apparatus employing the electrophotographic method, such as a copier, a printer, a facsimile machine, or a multifunctional peripheral having the aforementioned functions, for controlling the operation of conveying of a sheet which is a recording medium, when a conveyance failure of the sheet occurs in the image forming apparatus.

2. Description of the Related Art

Conventional image forming apparatuses such as copiers and printers have the following function. That is, when paper jam occurs, the sheet is conveyed to a location to avoid all boundary parts between units that can be pulled out, so that the sheet does not extend over plural units, thereby preventing the sheet from tearing into pieces (see, for example, patent document 1).

Patent document 1: Japanese Laid-Open Patent Application No. H2-163244

However, in the invention disclosed in the above conventional reference, the sheets are evacuated one by one. Thus, according to the conventional reference, every time a conveyance failure occurs, the sheets other than the sheet for which the conveyance failure has occurred are dispersed into different locations in the sheet conveying path. Accordingly, every time a conveyance failure occurs, the operator is required to remove the sheets from different locations. Therefore, the conventional reference requires complicated operations of removing the sheets from different locations, which leads to time-consuming operations in order to resolve the paper jam.

If in the invention disclosed in the conventional reference, every time a conveyance failure occurs, the sheets are prevented from dispersing to different locations so that the operator can resolve the paper jam by removing sheets from only a particular location, the following problem occurs. That is, conveyance control operations need to be performed to convey the sheets to the particular location, which leads to complicated operations in the apparatus.

Particularly, to respond to increasing demands for mass production in recent years and continuing, the sheet conveyance speed is increasing. Furthermore, image forming apparatuses are being configured to retain multiple sheets in an attempt to increase the sheet conveyance speed. With such a configuration, when conveyance failure occurs in the image forming apparatus, downtime will be required for removing sheets. During the downtime, the image forming apparatus is not capable of forming images on sheets. Accordingly, it is necessary to minimize the time required for removing sheets from an image forming apparatus.

Incidentally, in an image forming apparatus that is capable of mass production, the paper eject speed is, for example, approximately 90 sheets per minute, and the interval between sheets is approximately less than or equal to 70 mm.

SUMMARY OF THE INVENTION

The present invention provides an image forming apparatus in which one or more of the above-described disadvantages are eliminated.

A preferred embodiment of the present invention provides an image forming apparatus in which the operation of removing sheets is simplified.

According to an aspect of the present invention, there is provided an image forming apparatus including an image transferring unit configured to transfer an image to a recording medium, the image transfer unit being disposed on a recording medium conveying path through which the recording medium is conveyed; a fusing unit configured to fuse the image transferred by the image transferring unit with the recording medium, the fusing unit being disposed downstream of the image transferring unit on the recording medium conveying path in a recording medium conveying direction; a recording medium conveying unit configured to convey the recording medium conveyed from the image transferring unit to the fusing unit, the recording medium conveying unit being disposed between the image transferring unit and the fusing unit; a conveyance failure detecting unit configured to detect a conveyance failure of the recording medium, the conveyance failure detecting unit being provided on the recording medium conveying path; and a recording medium evacuation unit to which the recording medium in the recording medium conveying path can be evacuated in the event that the conveyance failure detecting unit detects the conveyance failure, wherein plural of the recording medium evacuation units are provided on the recording medium conveying path, and plural of the recording media can be evacuated to each of the recording medium evacuation units.

According to one embodiment of the present invention, there is provided an image forming apparatus including an image transferring unit configured to transfer an image to a recording medium, the image transfer unit being disposed on a recording medium conveying path through which the recording medium is conveyed; a fusing unit configured to fuse the image transferred by the image transferring unit with the recording medium, the fusing unit being disposed downstream of the image transferring unit on the recording medium conveying path in a recording medium conveying direction; a recording medium conveying unit configured to convey the recording medium conveyed from the image transferring unit to the fusing unit, the recording medium conveying unit being disposed between the image transferring unit and the fusing unit; a conveyance failure detecting unit configured to detect a conveyance failure of the recording medium, the conveyance failure detecting unit being provided on the recording medium conveying path; and a recording medium evacuation unit to which the recording medium in the recording medium conveying path can be evacuated in the event that the conveyance failure detecting unit detects the conveyance failure, wherein plural of the recording medium evacuation units are provided on the recording medium conveying path, and plural of the recording media can be evacuated to each of the recording medium evacuation units. Therefore, an image forming apparatus is provided, in which the operation of removing sheets is simplified

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
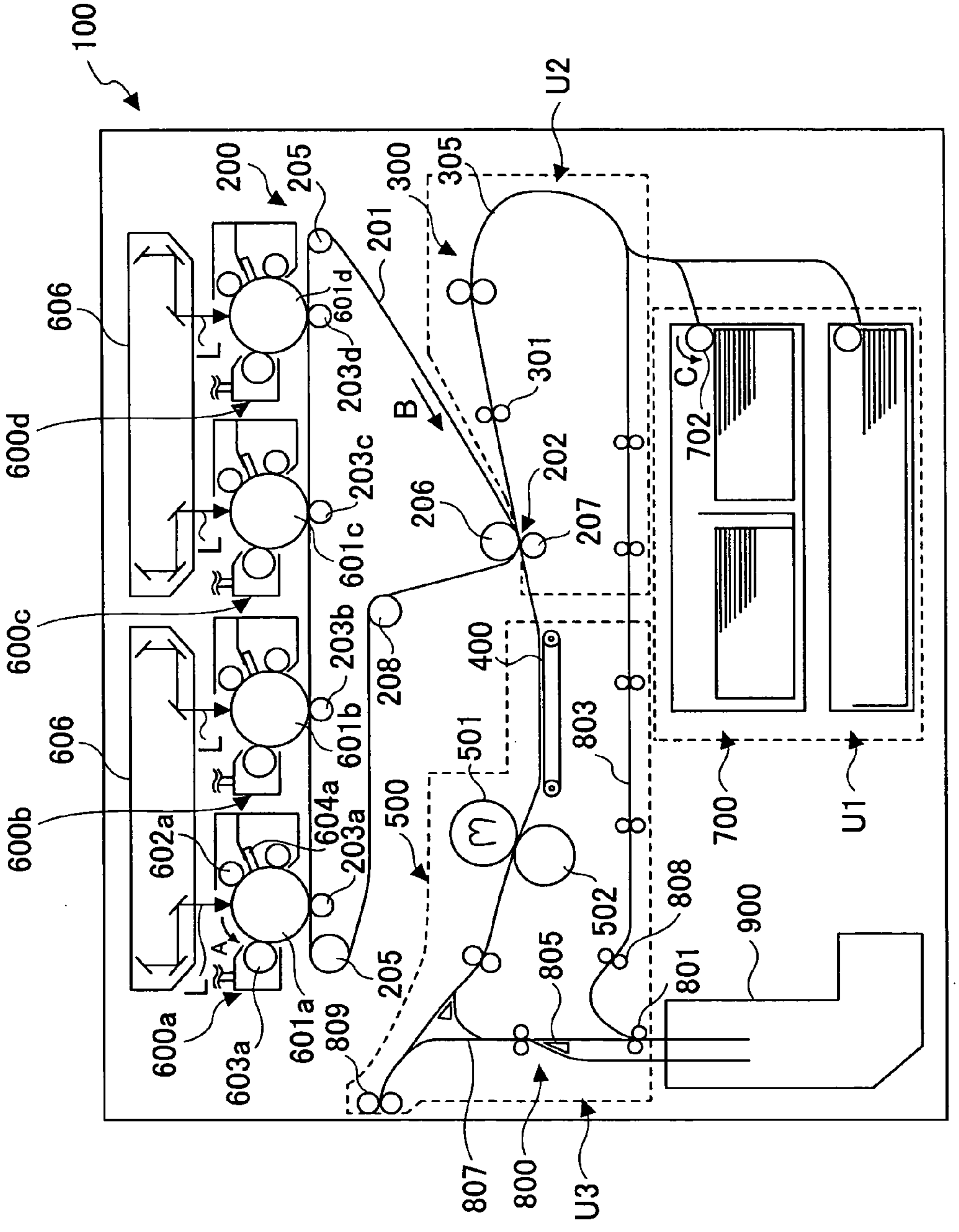
FIG. 1 is a cross-sectional view of the overall configuration of a printer according to a first embodiment of the present invention.

A description is given, with reference to the accompanying drawings, of an embodiment of the present invention. In the drawings, the same elements are given the same reference numerals, and redundant descriptions are appropriately simplified or omitted.

With reference to FIG. 1, a description is given of the configuration and operations of a printer 100 acting as an image forming apparatus according to a first embodiment of the present invention. As shown in FIG. 1, an intermediate transfer belt device 200 is disposed in the middle of the printer 100. Furthermore, image creating units 600*a* through 600*d* correspond to the colors yellow, magenta, cyan, and black, and are arranged in such a manner as to face an intermediate transfer belt 201 of the intermediate transfer belt device 200 in the printer 100. Furthermore, a sheet conveying device 300 is arranged at the bottom right side of the intermediate transfer belt device 200. A sheet conveying unit 400 is arranged between an image transfer unit 202 for transferring images onto sheets in the intermediate transfer belt device 200 and a fusing unit 500 for fusing the image.

As shown in FIG. 1, the image creating unit 600*a* corresponds to yellow, and includes a photoconductive drum 601*a* surrounded by a charging unit 602*a*, a developing unit 603*a*, a cleaning unit 604*a*, a discharging unit (not shown), etc. In the image creating unit 600*a*, an image creating procedure is performed on the photoconductive drum 601*a* ((1) charging step, (2) exposing step, (3) developing step, (4) transferring step, and (5) cleaning step), so that a yellow image is formed on the photoconductive drum 601*a*.

The other three image creating units 600*b*, 600*c*, and 600*d* use toner colors other than yellow, and form images of their corresponding toner colors; otherwise, the image creating units 600*b*, 600*c*, and 600*d* have substantially the same configurations as that of the image creating unit 600*a* corresponding to yellow. Thus, the following only describes the image creating unit 600*a* corresponding to yellow, and descriptions for the other three image creating units 600*b*, 600*c*, and 600*d* are omitted.

(1) Charging Step

The photoconductive drum 601*a* is rotated in a direction indicated by an arrow A in FIG. 1 by a not shown driving motor. At the position of the charging unit 602*a*, the surface of the photoconductive drum 601*a* is uniformly charged.

(2) Exposing Step

The surface of the photoconductive drum 601*a* reaches an irradiation position where a laser beam L is emitted from an exposing unit 606. Subsequently, at this position, an electrostatic latent image corresponding to yellow is formed by exposure scanning.

(3) Developing Step

The surface of the photoconductive drum 601*a* reaches a position facing the developing unit 603*a*. Subsequently, at this position, the electrostatic latent image is developed, so that a yellow toner image is formed.

(4) Transfer Step

The surface of the photoconductive drum 601*a* reaches a position facing the intermediate transfer belt 201 and a transfer roller 203*a*. Subsequently, at this position, the toner image on the photoconductive drum 601*a* is transferred onto the intermediate transfer belt 201, thereby performing a primary transfer step. At this stage, a small amount of toner remains on the photoconductive drum 601*a*, which is not transferred.

(5) Cleaning Step

The surface of the photoconductive drum 601*a* reaches a position facing the cleaning unit 604*a*. Subsequently, at this position, the toner remaining on the photoconductive drum 601*a*, which toner had not been transferred, is collected by a cleaning blade and put into a cleaning unit.

Finally, the surface of the photoconductive drum 601*a* reaches a position facing the not-shown discharging unit. Subsequently, at this position, the remaining potential on the photoconductive drum 601*a* is removed. Accordingly, the image creating procedure performed on the photoconductive drum 601*a* ends.

The image creating procedure is performed by the other image creating units 600*b*, 600*c*, and 600*d*, in the same manner as the image creating unit 600*a*.

That is, from the exposing units 606 disposed above the image creating units 600*a*, 600*b*, 600*c*, and 600*d*, a laser beam L based on image information is irradiated onto each of the photoconductive drums 601*b*, 601*c*, and 601*d* of the image creating units 600*b*, 600*c*, and 600*d*, respectively. Specifically, the exposing unit 606 emits a laser beam L from a light source, and scans the laser beam L with a rotating polygon mirror, so that the laser beam L is irradiated onto the photoconductive drums 601*b*, 601*c*, and 601*d* through plural optical elements.

Subsequently, toner images of the colors formed on the corresponding photoconductive drums 601*a*, 601*b*, 601*c*, and 601*d* that have undergone the developing step are transferred onto the intermediate transfer belt 201 in such a manner as to be superposed on one another. Thus, a color image is formed on the intermediate transfer belt 201.

The intermediate transfer belt device 200 includes four transfer rollers 203*a*, 203*b*, 203*c*, and 203*d*, a driving roller 205, the intermediate transfer belt 201 that is driven by the driving roller 205, a secondary transfer roller 206 arranged inside the intermediate transfer belt 201, and an opposed roller 207 and a tension roller 208 facing the intermediate transfer belt 201. In this manner, the intermediate transfer belt 201 is stretched and supported by plural roller members. Furthermore, the intermediate transfer belt 201 is caused to endlessly move in a direction indicated by an arrow B in FIG. 1 according to the rotation of the driving roller 205.

The four transfer rollers 203*a*, 203*b*, 203*c*, and 203*d* form nip sections for the primary transfer step, by sandwiching the intermediate transfer belt 201 with the photoconductive drums 601*a*, 601*b*, 601*c*, and 601*d*, respectively. Transfer voltages having polarities opposite to that of the toner are applied to the transfer rollers 203*a*, 203*b*, 203*c*, and 203*d*.

The intermediate transfer belt 201 moves in the direction indicated by the arrow B, and sequentially passes through the primarily transfer nip sections formed by the transfer rollers 203*a*, 203*b*, 203*c*, and 203*d*. Accordingly, the toner images of the respective colors formed on the photoconductive drums 601*a*, 601*b*, 601*c*, and 601*d* are superposed onto the intermediate transfer belt 201 in the primary transfer step.

Subsequently, the intermediate transfer belt 201, onto which the toner images of the respective colors have been transferred and superposed, reaches the image transfer unit 202 including the secondary transfer roller 206. At this position, the intermediate transfer belt 201 is sandwiched by the opposed roller 207 and the secondary transfer roller 206, thereby forming a secondary transfer nip section of the image transfer unit 202. The toner images of the four colors formed on the intermediate transfer belt 201 are transferred onto a sheet that is conveyed to the position of the image transfer unit 202. At this stage, some toner remains on the intermediate transfer belt 201, instead of having been transferred onto the sheet.

Subsequently, the surface of the intermediate transfer belt 201 reaches a position of a not-shown intermediate transfer cleaning unit. At this position, the toner remaining on the intermediate transfer belt 201 is removed. Accordingly, the sequence of the transfer process performed on the intermediate transfer belt 201 ends.

Next, with reference to FIG. 1, a description is given of a conveying process of a sheet, which is one example of a recording medium. The sheet is picked up by a sheet feeding roller 702 from a sheet feeding unit 700 disposed in the bottom part of the printer 100. The sheet is conveyed through the sheet conveying device 300, etc., to the image transfer unit 202. The sheet is then conveyed through the sheet conveying unit 400, the fusing unit 500, and a sheet reversing unit 800, and is ejected outside the printer by sheet eject rollers 809.

The sheet feeding unit 700 stores plural sheets stacked on one another. As the sheet feeding roller 702 is rotated in a counterclockwise direction as indicated by an arrow C in FIG. 1, the sheet feeding unit 700 feeds the top sheet toward the sheet conveying device 300. The sheet feeding unit 700 is not limited to being disposed at the bottom part of the printer 100. The sheet feeding unit 700 can be disposed on the side of the printer as an LCT (Large Capacity Tray) for storing plural sheets.

After receiving the sheet from the sheet feeding unit 700, the sheet conveying device 300 performs correction operations on the sheet with not shown conveying rollers, including vertical resist correction for performing positional shift correction in the sheet conveyance direction, horizontal resist correction for performing positional shift correction in the width direction, and skew correction. Subsequently, the sheet conveying device 300 conveys the sheet toward the image transfer unit 202 with the use of resist rollers 301 at the same timing as the color image on the intermediate transfer belt 201 approaches the image transfer unit 202. Accordingly, a desired color image is transferred onto the sheet.

After receiving the sheet from the image transfer unit 202, the sheet conveying unit 400 conveys the sheet toward the fusing unit 500. In this case, the sheet conveying unit 400 continues to attract the sheet with the use of a not-shown fan. Furthermore, the sheet conveying unit 400 includes a sheet conveying belt described below, which is rotated by a not-shown driving unit.

After receiving the sheet from the sheet conveying unit 400, the fusing unit 500 fuses the image transferred onto the surface of the sheet with the sheet, by applying heat and pressure with a fusing roller 501 and a pressurizing roller 502.

After receiving the sheet from the fusing unit 500, the sheet reversing unit 800 reverses the sheet depending on whether single-side printing or double-side printing is to be performed. Furthermore, the sheet reversing unit 800 includes sheet reversing rollers 801 having a function for reversing the sheet and conveying the sheet to the image transfer unit 202 and a function for reversing the sheet on which an image is formed and ejecting the sheet outside the printer, a flipping unit 805, a reverse eject path 807 for reversing and ejecting the sheet, and reconveying rollers 808 for conveying the sheet once again when performing double-side printing.

Subsequently, the sheet is ejected outside the printer 100 with the sheet eject rollers 809. The sheet is sequentially ejected onto a not-shown sheet eject unit as an output image. Accordingly, the sequence of the conveying process ends, from feeding the sheet to ejecting the sheet.

In a case where images are to be formed only on one side of a sheet, the sheet reversing unit 800 reverses the sheet in such a manner that the sheet is ejected with its printed face down. Furthermore, in a case where an image is to be formed on both sides of a sheet, the sheet reversing rollers 801 of the sheet reversing unit 800 reverse the sheet. Subsequently, the sheet passes through a reconveying path 803, and is once again sent into the image transfer unit 202. Furthermore, when images have been formed on both sides of a sheet, the sheet is ejected by the sheet eject rollers 809 without passing through the sheet reversing rollers 801.

In the present embodiment, the process linear speed of the printer 100 (the moving speed of the intermediate transfer belt 201 or the conveying speed of the sheet) is set at approximately 450 mm/s. In the present embodiment, a sheet conveying path 305 includes the sheet feeding unit 700 and the not shown sheet eject unit, which path 305 refers to a portion where the sheet can be conveyed from the sheet feeding unit 700 to the sheet eject unit.

Next, with reference to FIG. 1, a description is given of units that are detachably attached to the printer 100. As shown in FIG. 1, the printer 100 includes a sheet feeding unit U1, a sheet conveying unit U2, and a fusing and reversing unit U3. The corresponding aforementioned elements are provided in these units U1 through U3.

When a sheet conveyance failure occurs, the operator can remove the sheet by pulling out one of these units U1 through U3. When conveyance failure occurs in the printer 100 and the sheet stops in such a manner as to extend over these units U1 through U3, the sheet will be torn into pieces because these units U1 through U3 are detachable. Accordingly, in the present embodiment, the printer 100 controls the sheet so that the sheet does not stop in such a manner as to extend over these units. A tearing prevention position refers to a position at which the sheet does not extend over plural units when a sheet conveyance failure occurs.

Next, a description is given of a sheet evacuation unit according to the present embodiment. More specifically, the sheet conveying unit 400 acting as a sheet evacuation unit is disposed between the image transfer unit 202 and the fusing unit 500 as described above. The sheet conveying unit 400 is configured such that when a conveyance failure occurs, the plural sheets in the sheet conveying path 305 can be evacuated to the sheet conveying unit 400. The sheet conveying unit 400 is assumed to be the first sheet evacuation unit. The sheet conveying unit 400 acting as the first sheet evacuation unit is further described with reference to FIG. 3. A conveyance failure sheet evacuation unit 900 acting as a second sheet evacuation unit is disposed in the bottom part of the printer 100, and is arranged at the immediate downstream side of the sheet reversing unit 800 for reversing the sheet. When a conveyance failure occurs, plural sheets can be evacuated to the conveyance failure sheet evacuation unit 900, similar to the sheet conveying unit 400. Furthermore, the conveyance failure sheet evacuation unit 900 is provided in the sheet conveying path 305. The conveyance failure sheet evacuation unit 900 is further described with reference to FIG. 4.

In the present embodiment, in order to evacuate plural sheets to the sheet conveying unit 400, the space above the sheet conveying unit 400 needs to have a certain size. Thus, in the present embodiment, the space above the sheet conveying unit 400 is set to be approximately 50 mm high. Accordingly, plural sheets can be evacuated.

In the printer 100 according to the present embodiment, conveyance failures are apt to be caused by a sheet that has passed through the fusing unit 500. Particularly, when passing through the fusing unit 500, the sheet receives heat from the fusing unit 500, which changes the condition of the sheet. That is, the sheet may curl or extend because of the fusing unit 500. Therefore, the sheet conveying unit 400 is provided on the upstream side of the fusing unit 500 in the sheet conveyance direction as a first sheet evacuation unit. In the present embodiment, the sheet conveying unit 400 is provided on the upstream side of the fusing unit 500 in the sheet conveyance direction, thereby providing advantageous effects of reducing the impact of the change in the condition of the sheet caused by the fusing unit 500, and smoothly evacuating the sheet to the sheet conveying unit 400.

Figure 2A:
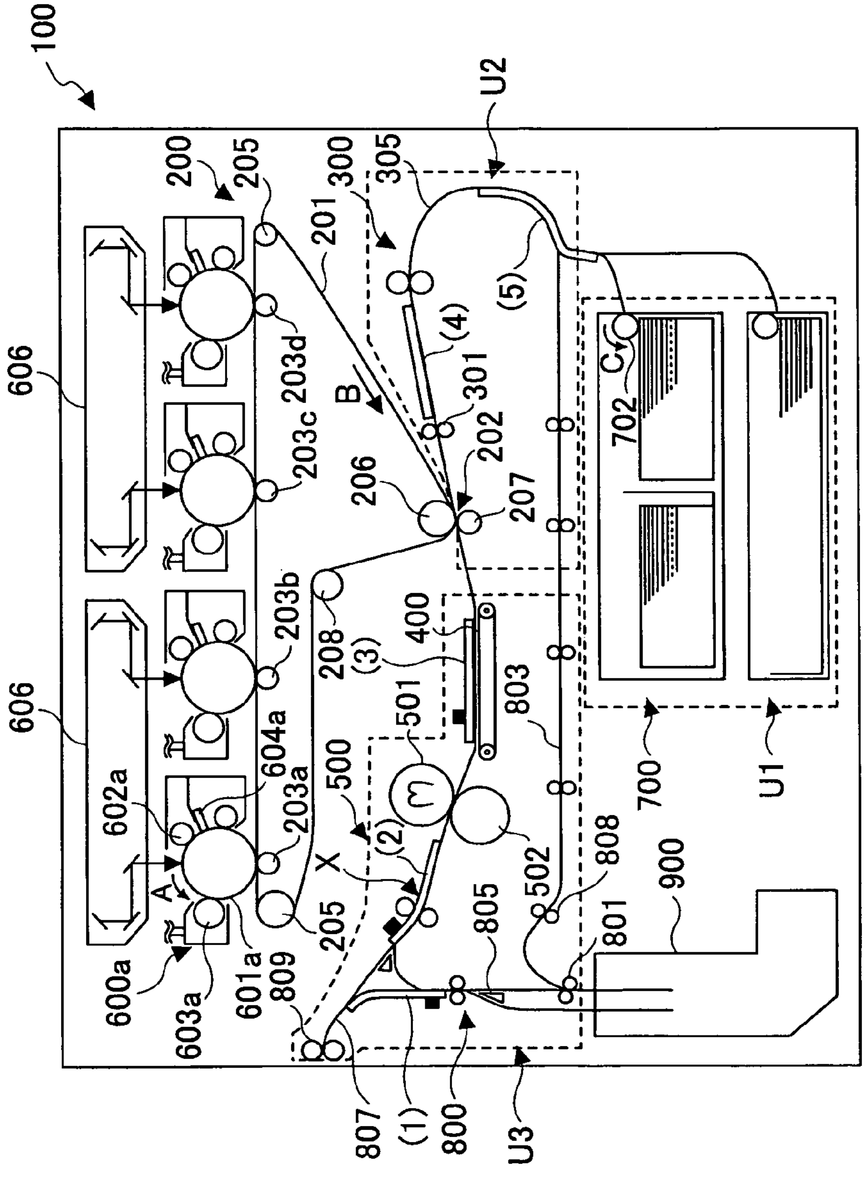
FIGS. 2A and 2B are cross-sectional views of the printer according to the first embodiment of the present invention when conveyance failures have occurred.
Figure 2B:
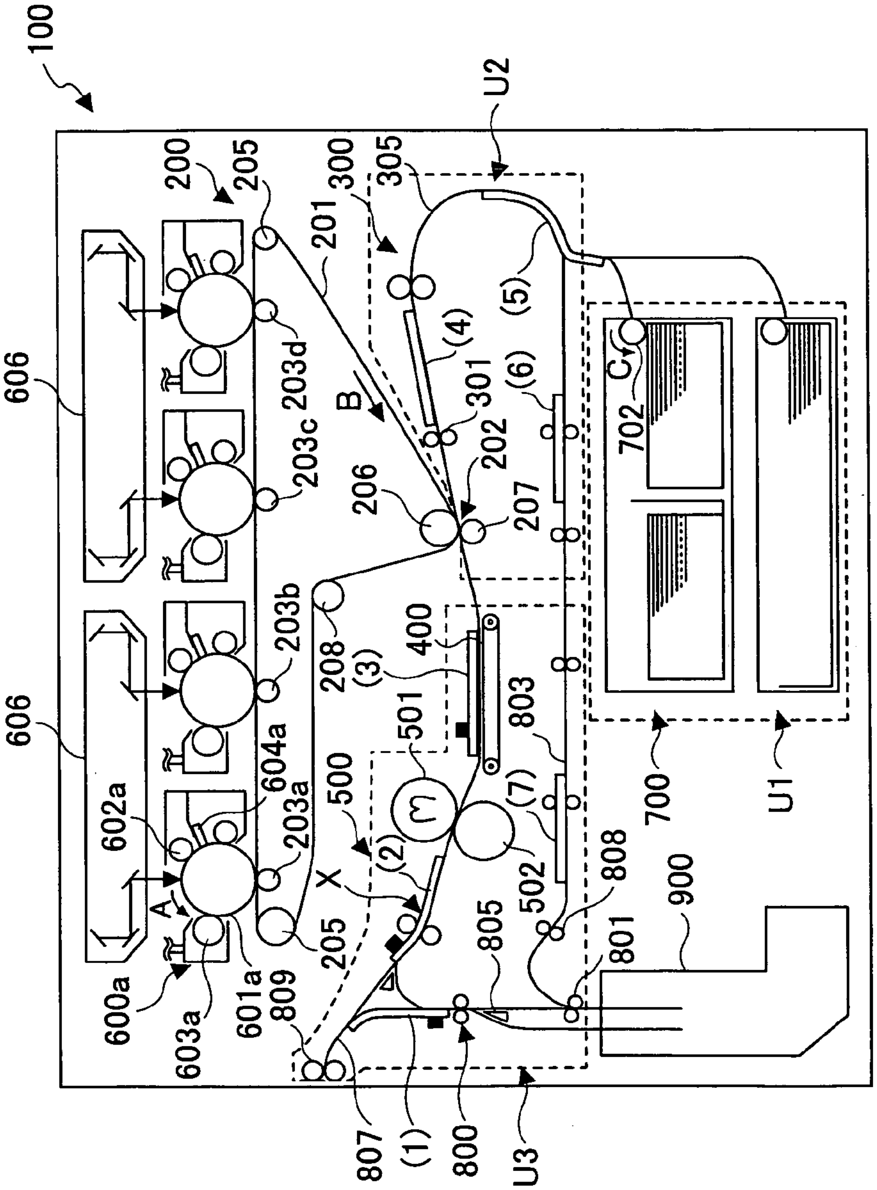

Next, with reference to FIGS. 2A and 2B, descriptions are given of operations of the printer in the event that conveyance failures have occurred, which is characteristic of the present embodiment. As described above, in the present embodiment, the printer 100 includes the sheet conveying unit 400 acting as the first sheet evacuation unit and the conveyance failure sheet evacuation unit 900 acting as the second sheet evacuation unit.

The following are examples of a conveyance failure. The first example is unreached jam, which means that a sheet does not reach a predetermined position at a predetermined time. The second example is retention jam, which means that a sheet is retained (stuck) at a predetermined position. The third example is multiple feeding, which means that plural overlapping sheets are conveyed together. The fourth example is skew, which means that the sheet is conveyed in a skewed manner. A conveyance failure caused as the sheet becomes an accordion-like form is considered as one phenomenon. Such a conveyance failure is detected as being either the unreached jam or the retention jam described above. Generally, in printers, conveyance failures are particularly apt to occur in the sheet feeding unit 700 for picking up a sheet, the fusing unit 500 for fusing an image on a sheet, and the sheet reversing unit 800 for reversing a sheet. These portions are where the sheet starts to be conveyed after being stopped, or the sheet is first conveyed at low speed and is then conveyed at high speed.

In the present embodiment, when a conveyance failure occurs such as multiple feeding or skew, the sheet can be evacuated to the sheet conveying unit 400 or the conveyance failure sheet evacuation unit 900. When a conveyance failure occurs, if a sheet is directly conveyed into the apparatus even, this conveyance failure may cause additional conveyance failures for preceding and succeeding sheets. In the present embodiment, even if a conveyance failure occurs such as multiple feeding or skew, it is possible to prevent a subsequent conveyance failure from occurring, which may be caused by an accordion-like sheet. Accordingly, the downtime of the printer 100 can be reduced.

Descriptions are given of a retained sheet where a conveyance failure has occurred. Separate descriptions are given for a case of forming an image on one side of a sheet and a case of forming images on both sides of a sheet. The printer 100 according to the present embodiment is configured such that 6 or 7 A4-sized sheets can be retained in the sheet conveying path 305. In the printer 100, a downstream side in the sheet conveyance direction means the direction in which the sheet is conveyed, i.e., a direction closer to the sheet eject unit, with respect to a particular reference location. An upstream side in the sheet conveyance direction means the direction from which the sheet is conveyed, i.e., a direction closer to the sheet feeding unit 700, with respect to a particular reference location.

When a conveyance failure occurs, the printer 100 first stops the sheet feeding operation of the sheet feeding unit 700. More specifically, the printer 100 stops driving the sheet feeding roller 702. Then, the sheets that can be normally ejected, other than the sheet for which a sheet conveyance failure has been detected, are normally ejected outside the printer 100. The sheets that cannot be normally ejected are conveyed to the conveyance failure sheet evacuation unit 900. An example of a sheet that cannot be normally ejected is a sheet which is supposed to have images formed on both sides but only has an image formed on one side. Furthermore, sheets that cannot be conveyed to the conveyance failure sheet evacuation unit 900 are conveyed to the sheet conveying unit 400.

Sheets that cannot be conveyed to the conveyance failure sheet evacuation unit 900 or the sheet conveying unit 400 are conveyed to a tearing prevention position among the units. In the present embodiment, the sheets that can be normally ejected are ejected, regardless of being upstream or downstream the sheet for which the conveyance failure had occurred. As described above, sheets that cannot be normally ejected are conveyed to the conveyance failure sheet evacuation unit 900, the sheet conveying unit 400, or the tearing prevention position among the units, in that order of priority.

For example, in the present embodiment, supposing the sheet is to be evacuated to the sheet conveying unit 400, there are two cases as illustrated in FIGS. 2A and 2B.

(A) In the Case of Forming an Image on One Side

In the printer 100, in the case of forming an image on one side, sheets (1) through (5) can be retained in the sheet conveying path 305. In the present embodiment, as shown in FIG. 2A, it is assumed that a conveyance failure has occurred for the sheet (2) at the location X near the exit of the fusing unit 500. The printer 100 normally ejects the sheet (1), because an image is already formed on one side. The printer stops the sheet (2) at the location X if the conveyance failure is such that the sheet (2) cannot be conveyed in the sheet conveyance direction. The printer 100 conveys the sheets (3), (4), and (5) to the sheet conveying unit 400, because they are on the upstream side of the sheet (2) in the sheet conveyance direction and thus cannot be conveyed to the conveyance failure sheet evacuation unit 900.

(B) In the Case of Forming Images on Both Sides

In the printer 100, in the case of forming images on both sides, sheets (1) through (7) can be retained in the sheet conveying path 305. In the present embodiment, as shown in FIG. 2B, it is assumed that a conveyance failure has occurred for the sheet (2) at the location X near the exit of the fusing unit 500. As shown in FIG. 2B, the printer 100 normally ejects the sheet (1) because images are already formed on both sides. The printer stops the sheet (2) at the location X if the conveyance failure is such that the sheet (2) cannot be conveyed in the sheet conveyance direction. The printer 100 conveys the sheets (3), (4), (5), (6), and (7) to the sheet conveying unit 400 or to a tearing prevention position, because they are on the upstream side of the sheet (2) in the sheet conveyance direction and thus cannot be conveyed to the conveyance failure sheet evacuation unit 900.

Figure 3:
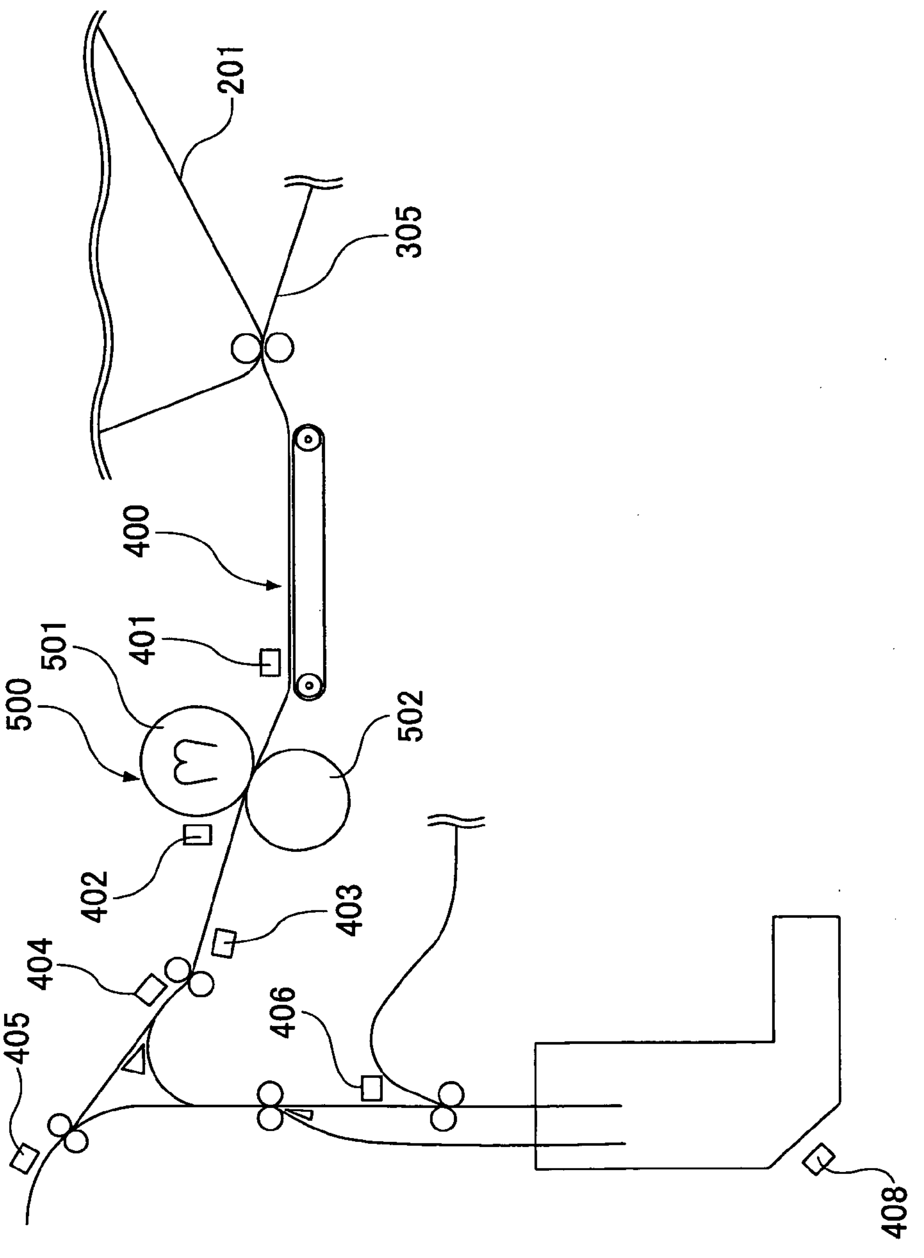
FIG. 3 is an enlarged view of relevant parts of a fusing unit according to the first embodiment of the present invention.

Next, with reference to FIG. 3, a description is given of a case where the sheet is evacuated to the sheet conveying unit 400, which is characteristic of the present embodiment. As shown in FIG. 3, sensors near the fusing unit 500 acting as conveyance failure detecting units provided along the sheet conveying path 305 include a sheet conveyance unit sensor 401, a fuser exit sensor 403 provided at the exit of the fusing unit 500, flip sensors 404, 406 provided at the flipping unit, an ejection exit sensor 405 provided at the ejection exit, and a wrap sensor 402 for detecting whether a sheet is wrapped around the fusing roller 501. When the wrap sensor 402 detects that the sheet has been wrapped around the fusing roller 501, the power of the fusing unit 500 is immediately turned off, and the fusing roller 501 and the pressurizing roller 502 are separated from one another.

In the printer 100 according to the present embodiment, when the sheet conveyance unit sensor 401 detects that a sheet is retained (stuck), when the fuser exit sensor 403 detects that a sheet is unreached or retained, when the flip sensor 404 detects that a sheet is unreached or retained, when the ejection exit sensor 405 detects that a sheet is unreached, or when the wrap sensor 402 detects that a sheet is wrapped around the fusing roller 501, the sheet on the upstream side of the detected sheet in the conveyance direction is conveyed to the sheet conveying unit 400 or the tearing prevention positions in the units U1 through U3. When the ejection exit sensor 405 detects that a sheet is unreached, it means that a sheet that has been reversed in single-side printing, or a sheet that does not pass through the sheet reversing unit 800 in double-side printing, does not reach the ejection exit sensor 405.

As shown in FIG. 3, in the present embodiment, when a conveyance failure is detected, the sheet passes through the intermediate transfer belt 201 and the secondary transfer roller 206, and the sheet is then evacuated to the sheet conveying unit 400, which is on the upstream side of the fusing unit 500 in the sheet conveyance direction. In this case, if electric current is passing though the intermediate transfer belt 201, an unintended image may be formed on the evacuated sheet. Furthermore, this unintended toner image will not have been fused, and therefore if this sheet is evacuated to the sheet conveying unit 400, the unfused toner may adhere to the sheet conveying unit 400. If so this unfused toner will solidify due to the heat of the fusing unit 500 arranged near the sheet conveying unit 400, which toner may form bumpy obstacles on the sheet conveying unit 400. To solve this problem, in the present embodiment, the printer 100 stops feeding power to the intermediate transfer belt 201. By doing so, it is possible to prevent a sheet with an unfused image from being evacuated to the sheet conveying unit 400. The timing of stopping the power to the intermediate transfer belt 201 when a conveyance failure is detected can be any time before the sheet to be evacuated to the sheet conveying unit 400 reaches the image transfer unit 202.

Furthermore, even when the printer 100 does not stop feeding power to the intermediate transfer belt 201, a control operation can be performed to separate the secondary transfer roller 206 and the opposed roller 207 from the intermediate transfer belt 201. Accordingly, it is possible to prevent unfused toner from adhering to a sheet that is to be evacuated. This separation can be performed by moving at least one of the secondary transfer roller 206 and the opposed roller 207. In the present embodiment, these rollers do not necessarily need to be separated, as long as a nip is prevented from being formed between these rollers.

The sheet conveying unit 400 can include plural conveying belts in the sheet conveyance direction, and each belt can be separately controlled. In the present embodiment, the speed of conveying a sheet toward the fusing unit 500 can be changed. Furthermore, when evacuating the sheet, the sheet can be evacuated smoothly. Particularly, as plural control mechanisms operate separately from one another, a sheet that is ejected downstream in the sheet conveyance direction can be conveyed even closer to the fusing unit 500, so that a sheet that has been ejected from the image transfer unit 202 can be smoothly evacuated to the sheet conveying unit 400, thereby achieving an advantageous effect.

Furthermore, in the present embodiment, when a sheet is evacuated to the sheet conveying unit 400, it is possible to stop the fusing roller 501 of the fusing unit 500 from applying heat, regardless of whether the power of the fusing unit 500 is immediately stopped. By stopping the fusing roller 501 from applying heat, the temperature of the fusing unit 500 will not be needlessly maintained, thereby achieving an advantageous effect in terms of the heat efficiency of the printer 100. The timing of stopping the fusing roller 501 from applying heat can be after a conveyance failure has been detected.

Figure 4:
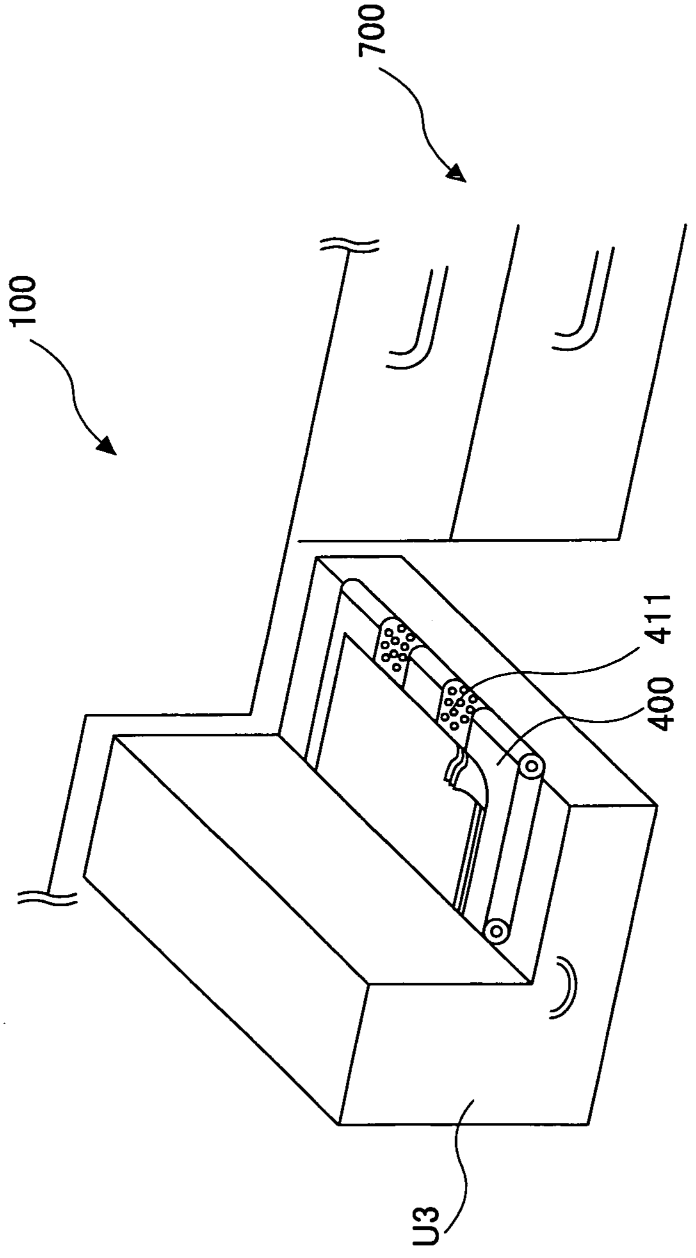
FIG. 4 is a perspective view of a sheet conveying unit disposed between an image transfer unit and a fusing unit and pulled out from the printer according to the first embodiment of the present invention.
Figure 5:
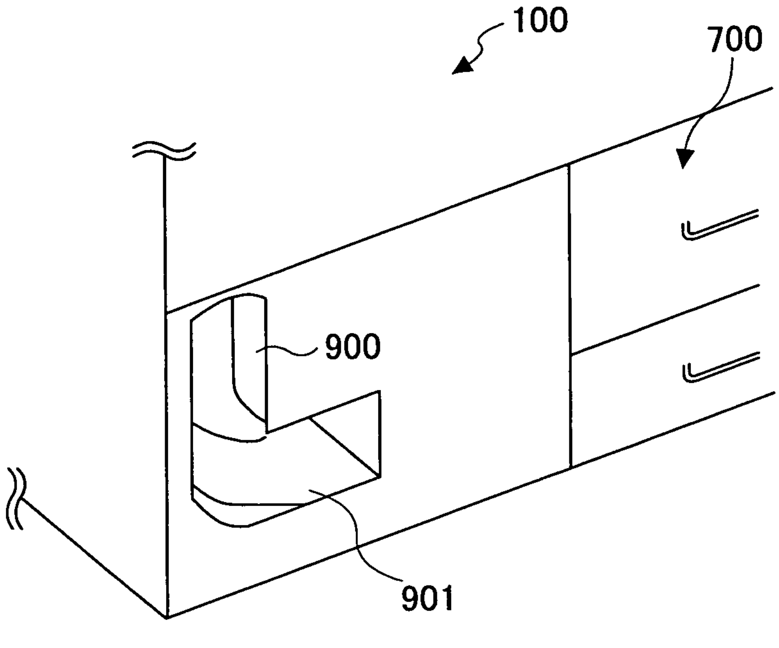
FIG. 5 is a perspective view of a conveyance failure sheet evacuation unit as a second sheet evacuation unit, which is arranged at a sheet reversing unit according to the first embodiment of the present invention.

Next, with reference to FIGS. 4 and 5, configurations of the first sheet evacuation unit and the second sheet evacuation unit are described.

FIG. 4 is a perspective view of the sheet conveying unit 400 having been pulled out from the printer 100, which sheet conveying unit 400 is disposed between the image transfer unit 202 and the fusing unit 500. FIG. 4 also illustrates plural sheets being evacuated. The sheet conveying unit 400 includes a conveying belt 411 which conveys sheets. When a sheet is evacuated to the sheet conveying unit 400, a not-shown attraction unit such as a fan attracts the sheet to the conveying belt 411 from underneath the sheet conveying unit 400.

Furthermore, in the present embodiment, when a sheet is evacuated to the sheet conveying unit 400, the not shown attraction unit can continue attracting the sheet to the conveying belt 411. Accordingly, the sheet can be smoothly placed on the conveying belt 411. The attraction unit can continue the attraction operation until the conveying belt 411 stops moving. In the present embodiment, when a sheet is evacuated to the sheet conveying unit 400, the sheet that is first evacuated to the sheet conveying unit 400 adheres to the sheet conveying unit 400, and therefore a space can be secured above the sheet conveying unit 400 for subsequently evacuated sheets, thereby achieving an advantageous effect of smoothly evacuating sheets.

FIG. 5 illustrates the conveyance failure sheet evacuation unit 900 as the second sheet evacuation unit, which is arranged at the sheet reversing unit 800.

The conveyance failure sheet evacuation unit 900 is substantially L-shaped, as viewed in a cross-section of the printer 100. A sheet sensor 408 (see FIG. 4) for detecting an evacuated sheet, is provided in the conveyance failure sheet evacuation unit 900. The conveyance failure sheet evacuation unit 900 is not limited to having an L-shape; however, the conveyance failure sheet evacuation unit 900 is preferably configured to include at least a horizontal portion 901 so that part of the sheet can be stored in a horizontal direction. In the present embodiment, the type of sheet that can be evacuated to the conveyance failure sheet evacuation unit 900 is not limited.

Furthermore, in the printer 100, the sheet sensor 408 (see FIG. 4) is provided near the conveyance failure sheet evacuation unit 900. Moreover, the sheet conveying path in the sheet reversing unit 800 is divided in two directions by the flipping unit 805. Even if a convenience failure is detected in the sheet reverse eject path, the sheet can be evacuated to the conveyance failure sheet evacuation unit 900 by the flipping unit 805, thereby achieving an advantageous effect. Furthermore, the conveyance failure sheet evacuation unit 900 is arranged at the bottom part of the printer 100. Accordingly, even if a driving force is not applied to the sheet reversing rollers 801 (see FIG. 1) of the sheet reversing unit 800, the sheet can be conveyed to the conveyance failure sheet evacuation unit 900 by the sheet's own weight.

In the present embodiment, when the operator attempts to resolve the paper jam, the operator opens a not-shown door, and removes sheets from the sheet conveying unit 400 to which plural sheets can be evacuated, or from the conveyance failure sheet evacuation unit 900 having the same feature as the sheet conveying unit 400, or from any of the units U1 through U3. In the conventional technology, the sheets are evacuated one by one to tearing prevention positions in the apparatus. Thus, in conventional cases, every time a conveyance error occurs, sheets other than the sheet for which a conveyance failure has occurred are dispersed in different locations along the sheet conveying path. Accordingly, every time a conveyance failure occurs, the operator is required to remove the sheets from different locations. Thus, conventional cases require complicated operations of removing the sheets from different locations. In the conventional technology, there is not enough space for evacuating plural sheets as described above, and therefore the operator needs to remove sheets from different locations for every attempt to resolve a paper jam. However, according to the present embodiment, plural sheets can be evacuated to the sheet conveying unit 400 or the conveyance failure sheet evacuation unit 900, and therefore the operator can resolve: the paper jam by removing sheets from the sheet conveying unit 400 to which plural sheets can be evacuated, the conveyance failure sheet evacuation unit 900 having the same feature as the sheet conveying unit 400, and the units U1 through U3. Accordingly, the operation of resolving the paper jam is facilitated and the downtime is reduced.

As described above, in the printer 100 according to the present embodiment, sheets are evacuated to the sheet conveying unit 400, which is on the downstream side of the image transfer unit 202 in the conveyance direction and on the upstream side of the fusing unit 500 in the conveying direction. Therefore, the operator can resolve the paper jam by removing sheets from predetermined locations, thereby providing an image forming apparatus capable of reducing the recovery time after paper jam occurs.

Figure 6:
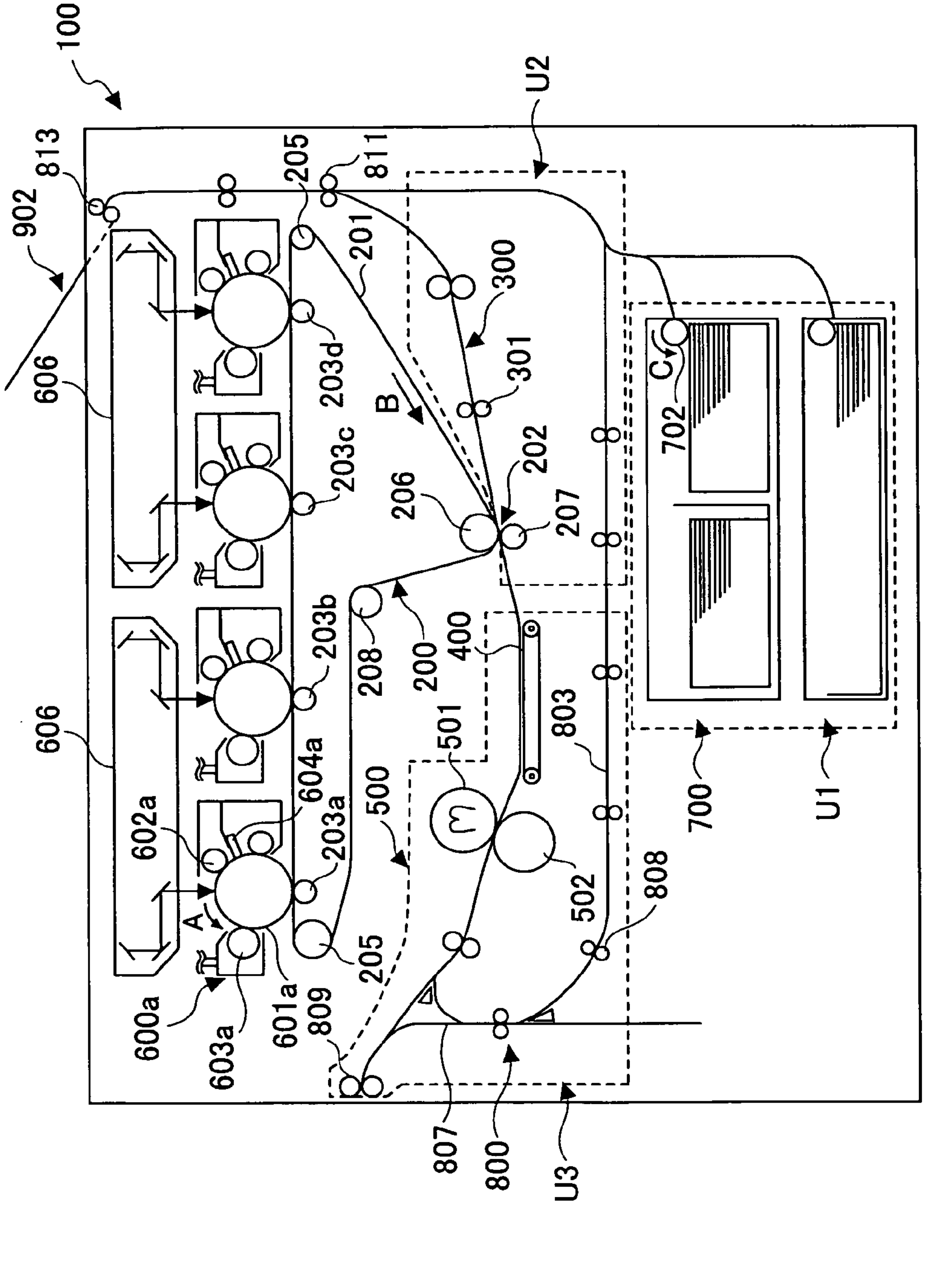
FIG. 6 is a cross-sectional view of the overall configuration of a printer according to a second embodiment of the present invention.

Next, a description is given of a second embodiment according to the present invention with reference to FIG. 6. The difference between the second embodiment and the first embodiment is that in the second embodiment, a conveyance failure sheet evacuation unit 902 is disposed at a top part outside the apparatus. Another different point is that a sheet reversing unit 811 is arranged in such a manner as to be connected to the sheet conveying device 300. Furthermore, the printer 100 according to the second embodiment includes sheet discharge rollers 813 having a function of evacuating sheets to the conveyance failure sheet evacuation unit 902. The other points are substantially the same as the first embodiment, and are not further described.

In the present embodiment, when a conveyance failure is detected, the sheets can be evacuated to the conveyance failure sheet evacuation unit 902 and the sheet conveying unit 400. In the present embodiment, the conveyance failure sheet evacuation unit 902 is disposed at a top part outside the apparatus. This is advantageous in that the operator can easily remove the sheet for which a conveyance failure has occurred. The position of the conveyance failure sheet evacuation unit 902 is not limited to that of the present embodiment; the conveyance failure sheet evacuation unit 902 can be located in accordance with the configuration of the printer 100.

According to an aspect of the present invention, there is provided an image forming apparatus including an image transferring unit configured to transfer an image to a recording medium, the image transfer unit being disposed on a recording medium conveying path through which the recording medium is conveyed; a fusing unit configured to fuse the image transferred by the image transferring unit with the recording medium, the fusing unit being disposed downstream of the image transferring unit on the recording medium conveying path in a recording medium conveying direction; a recording medium conveying unit configured to convey the recording medium conveyed from the image transferring unit to the fusing unit, the recording medium conveying unit being disposed between the image transferring unit and the fusing unit; a conveyance failure detecting unit configured to detect a conveyance failure of the recording medium, the conveyance failure detecting unit being provided on the recording medium conveying path; and a recording medium evacuation unit to which the recording medium in the recording medium conveying path can be evacuated in the event that the conveyance failure detecting unit detects the conveyance failure, wherein plural of the recording medium evacuation units are provided on the recording medium conveying path, and plural of the recording media can be evacuated to each of the recording medium evacuation units.

According to an aspect of the present invention, the image processing apparatus further includes at least a first recording medium evacuation unit and a second recording medium evacuation unit.

According to an aspect of the present invention, in the image processing apparatus, the first recording medium evacuation unit is provided downstream of the image transferring unit in the recording medium conveying direction and upstream of the fusing unit in the recording medium conveying direction.

According to an aspect of the present invention, in the image processing apparatus, the first recording medium evacuation unit includes said recording medium evacuation unit.

According to an aspect of the present invention, the image processing apparatus further includes a recording medium reversing unit configured to reverse the recording medium conveyed from the fusing unit, wherein the second recording medium evacuation unit is provided at the recording medium reversing unit.

According to an aspect of the present invention, in the image processing apparatus, the image transferring unit includes a transfer unit and an opposed unit facing the transfer unit; and in the event that the conveyance failure detecting unit detects the conveyance failure and the recording medium is to be evacuated to the first recording medium evacuation unit, the transfer unit and the opposed unit are separated from one another.

According to an aspect of the present invention, in the image processing apparatus, in the event that the conveyance failure detecting unit detects the conveyance failure and the recording medium is to be evacuated to the first recording medium evacuation unit, power is cut off from the image transferring unit.

According to an aspect of the present invention, in the image processing apparatus, plural of the recording medium conveying units are provided in the recording medium conveying direction, wherein the recording medium conveying units are controlled separately from one another.

According to an aspect of the present invention, in the image processing apparatus, the recording medium conveying unit includes a conveying belt configured to convey the recording medium.

The present invention is not limited to the specifically disclosed embodiments, and variations and modifications may be made without departing from the scope of the present invention. The quantities, positions, and configurations of the elements described above are not limited to the specifically disclosed embodiments; any preferable quantity, position, and configuration for implementing the present invention is possible.

Furthermore, the present embodiment is applicable to a printer device for printing images onto roll paper. The operation of resolving the paper jam can also be facilitated in such a printer device when a conveyance failure is detected in the conveying path.

The present application is based on Japanese Priority Patent Application No. 2007-212331, filed on Aug. 16, 2007, the entire contents of which are hereby incorporated herein by reference.

What is claimed is:

1. An image forming apparatus comprising:

an image transferring unit configured to transfer an image to a recording medium, the image transfer unit being disposed on a recording medium conveying path through which the recording medium is conveyed;

a fusing unit configured to fuse the image transferred by the image transferring unit with the recording medium, the fusing unit being disposed downstream of the image transferring unit on the recording medium conveying path in a recording medium conveying direction;

a recording medium conveying unit configured to convey the recording medium conveyed from the image transferring unit to the fusing unit, the recording medium conveying unit being disposed between the image transferring unit and the fusing unit;

a conveyance failure detecting unit configured to detect a conveyance failure of the recording medium, the conveyance failure detecting unit being provided on the recording medium conveying path; and first and second recording medium evacuation units to which the recording medium in the recording medium conveying path can be evacuated in the event that the conveyance failure detecting unit detects the conveyance failure, wherein:

the first and second recording medium evacuation units are provided on the recording medium conveying path, and plural of the recording media can be evacuated to each of the first and second recording medium evacuation units, when there is a recording medium, which cannot not be conveyed, positioned between the first recording medium evacuation unit and the second recording medium evacuation unit, plural recording media positioned on an upstream side in the recording medium conveying direction with respect to the second recording medium evacuation unit are conveyed and evacuated to the second recording medium evacuation unit, and when there is no recording medium, which cannot not be conveyed, positioned between the first recording medium evacuation unit and the second recording medium evacuation unit, plural recording media positioned on an upstream side in the recording medium conveying direction with respect to the second recording medium evacuation unit are conveyed and evacuated to the first recording medium evacuation unit.

2. The image forming apparatus according to claim 1, wherein:

the first recording medium evacuation unit is provided downstream of the image transferring unit in the recording medium conveying direction and upstream of the fusing unit in the recording medium conveying direction.

3. The image forming apparatus according to claim 1, further comprising:

a recording medium reversing unit configured to reverse the recording medium conveyed from the fusing unit, wherein:

the second recording medium evacuation unit is provided at the recording medium reversing unit.

4. The image forming apparatus according to claim 2, wherein:

the image transferring unit comprises a transfer unit and an opposed unit facing the transfer unit; and in the event that the conveyance failure detecting unit detects the conveyance failure and the recording medium is to be evacuated to the first recording medium evacuation unit, the transfer unit and the opposed unit are separated from one another.

5. The image forming apparatus according to claim 2, wherein:

in the event that the conveyance failure detecting unit detects the conveyance failure and the recording medium is to be evacuated to the first recording medium evacuation unit, power is cut off from the image transferring unit.

6. The image forming apparatus according to claim 1, wherein:

plural of the recording medium conveying units are provided in the recording medium conveying direction, wherein the recording medium conveying units are controlled separately from one another.

7. The image forming apparatus according to claim 1, wherein:

the recording medium conveying unit comprises a conveying belt configured to convey the recording medium.

8. The image forming apparatus according to claim 1, wherein the first and second recording medium evacuation units are between a first paper feed roller and an exit roller that directly outputs the recording medium from the image forming apparatus.

9. The image forming apparatus according to claim 1, wherein the conveyance failure detecting unit is further configured to detect at least one of a paper jam, plural overlapping sheets of the recording media, and a skewed sheet of the recording media.

* * * * *